United States Patent [19]
Broadbent

[11] Patent Number: 5,080,937
[45] Date of Patent: Jan. 14, 1992

[54] REDUCING OR AVOIDING PINHOLE FORMATION IN AUTODEPOSITION

[75] Inventor: Ronald W. Broadbent, Horsham, Pa.

[73] Assignee: Henkel Corporation, Ambler, Pa.

[21] Appl. No.: 429,443

[22] Filed: Oct. 30, 1989

[51] Int. Cl.[5] .............................................. C23C 26/00
[52] U.S. Cl. ................................... 427/435; 427/430.1
[58] Field of Search ............................. 427/435, 430.1

[56] References Cited

U.S. PATENT DOCUMENTS

| | | | |
|---|---|---|---|
| 3,592,699 | 7/1971 | Steinbrecher et al. | 148/6.2 |
| 3,963,796 | 6/1976 | Yokono | 525/382 |
| 4,108,817 | 8/1978 | Lochel, Jr. | 260/29.6 |
| 4,178,400 | 12/1979 | Lochel, Jr. | 427/435 |
| 4,199,624 | 4/1980 | Smith | 427/309 |
| 4,242,379 | 12/1980 | Hall et al. | 427/327 |
| 4,243,704 | 1/1981 | Hall | 427/435 |
| 4,293,592 | 10/1981 | Morishita | 427/98 |
| 4,373,050 | 2/1983 | Steinbrecher | 427/435 |
| 4,647,480 | 3/1987 | Ahmed | 427/435 |

FOREIGN PATENT DOCUMENTS

| | | | |
|---|---|---|---|
| 50235 | 4/1982 | European Pat. Off. | 427/435 |
| 132828 | 2/1985 | European Pat. Off. | 427/435 |

Primary Examiner—Shrive P. Beck
Assistant Examiner—Vi. Duong Dang
Attorney, Agent, or Firm—Ernest G. Szoke; Wayne C. Jaeschke; Norvell E. Wisdom, Jr.

[57] ABSTRACT

Pinhole and blister formation during autodeposition coating of active metal objects, particularly galvanized steel, other zinciferous surfaces, and even ordinary steel that has been abraded, scratched, or otherwise strained, can be greatly reduced by exposing the active metal surfaces to a solution containing cystine before using a autodeposition process itself, or by adding cystine to an otherwise conventional autodeposition composition.

20 Claims, No Drawings

REDUCING OR AVOIDING PINHOLE FORMATION IN AUTODEPOSITION

FIELD OF THE INVENTION

This invention relates to the use of liquid, usually aqueous, solutions or dispersions in which active metal surfaces of inserted objects are coated with an adherent polymer film that increases in thickness the longer the metal object remains in the bath, even though the liquid is stable for a long time against spontaneous precipitation or flocculation of any solid polymer, in the absence of contact with active metal. Such compositions are commonly denoted in the art, and in this specification, as "autodeposition" compositions, dispersions, emulsions, suspensions, baths, solutions, or a like term. Autodeposition is often contrasted with electrodeposition, which can produce very similar adherent films but requires that metal or other objects to be coated be connected to a source of direct current electricity for coating to occur.

Autodeposition compositions previously known in the art are effective for coating most metals of practical interest, but it has been observed that attempting autodeposition coating of some particularly active metal surfaces, i.e., surfaces that dissolve more readily than ordinary steel when in contact with acidic aqueous solutions, often results in coatings with many small "pinholes" or larger blisters. Such coatings fail to provide the protection against the environment that is normally wanted from autodeposition coatings. Reducing or eliminating this problem is a major object of this invention. Because specific areas of ordinary steel objects, especially scratched and/or abraded areas and sharp edges, may be "active" in the sense defined above, the problem is widely encountered in coating even steel objects, and it is particularly likely to be observed when attempting to coat zinciferous surfaces, such as those of galvanized steel, by autodeposition.

DESCRIPTION OF RELATED ART

U.S. Pat. No. 3,592,699 of July 13, 1971 to Steinbrecher et al. is one of the early basic patents on autodeposition. It teaches autodeposition baths generally containing an appropriate polymer latex, an appropriate amount of a soluble oxidizing agent such as hydrogen peroxide or dichromate ion, fluoride ions, and sufficient acid to keep the pH within the range of about 2.5-3.5.

U.S. Pat. Nos. 4,108,817 of Aug. 22, 1978 and 4,178,400 of Dec. 11, 1979, both to Lochel and both derived from the same initial application, address the same problem as this invention. They teach the use of corrosion inhibitors as additives to autodeposition baths to avoid hole formation. Aldehydes, ketones, amines, thiols, sulfides, thioureas, silicates, phosphates, carbonates, nitrites, oximes, alkynols, chromates, and dichromates are all taught as suitable by these references, with propargyl alcohol and certain mixtures of thiourea with products of a Mannich reaction between pine resin amines, acetophenone, acetone, and formaldehyde being taught as especially preferred.

U.S. Pat. No. 4,242,379 of Dec. 30, 1980 to Hall et al. also addressed the same problem as this invention. Hall teaches that inhibitors against corrosion of metals in acids, such as those taught by Lochel as additives to an autodeposition bath, can be used instead as a pretreatment before autodeposition. Advantageously, the inhibitors may be combined with conventional alkaline cleaners in a pretreatment step.

U.S. Pat. No. 4,199,624 of Apr. 22, 1980 to Smith teaches that an acid pretreatment of metal substrates can be effective to prevent coating defects in subsequent autodeposition coating of the treated substrates. Common inorganic acids, especially phosphoric acid, are preferred as the acid constituents of the pretreatment compositions according to this reference.

U.S. Pat. No. 4,243,704 of Jan. 6, 1981 to Hall et al. also addresses the problem of preventing pinholes during autodeposition and teaches that temperature control during the process can be effective for this purpose.

All the above mentioned U.S. Patents are hereby incorporated herein by reference in their entirety, except for any parts thereof which may expressly contradicted herein.

DESCRIPTION OF THE INVENTION

Except in the operating examples, or where otherwise expressly indicated, all numerical quantities in this description indicating amounts of material or reaction conditions are to be understood as modified by the word "about".

It has now been found that pretreatment contact of metals with an acidic aqueous solution containing cystine is exceptionally effective in reducing any tendency that might otherwise exist for particularly active metal surfaces to form coatings with pinholes or similar defects in subsequent autodeposition. Cystine is also highly effective for coating defect prevention when used as an additive to an autodeposition bath.

It is preferred to use cystine according to this invention in a pretreatment step, because of the reduced risk of adversely affecting the stability of the autodeposition bath itself. However, cystine has shown excellent effectiveness also when used as an additive to an autodeposition bath.

Cystine is effective as a constituent of a pretreatment composition in quite small concentrations, at least as low as 25 parts per million by weight (hereinafter "ppm"). Concentrations up to as much as 0.1% by weight, which is the approximate solubility of cystine in neutral water, have been tested in a pretreatment solution and also found to be effective, and it is expected that still higher concentrations would also be effective although there is little reason to use them in treatment itself. Solutions with higher concentrations of cystine than 0.1% are useful, however, as concentrates from which pretreatment baths or autodeposition baths according to this invention may conveniently be prepared.

To obtain concentrations of cystine higher than about 0.1% by weight in aqueous solution, additions of strong acids may be used. For example, as much as one gram of cystine can be dissolved in 50 milliliters ("ml") of 20% hydrofluoric acid solution in water. Although any strong acid may effectively be used in this invention. It is preferable to use the same acid for solubilizing the cystine as is used in the subsequent autodeposition bath itself. This reduces the risk of adverse results if small amounts of acid are carried over from the pretreatment to the autodeposition stage.

In general at present in the art, autodeposition compositions with hydrofluoric acid are preferred over those with other inorganic acids, so that hydrofluoric acid is preferred as the solubilizer for cystine when used as a pretreatment according to this invention. There is no disadvantage in effectiveness, and may even be an advantage, when cystine is used together with hydrofluoric acid in the pretreatment process according to this invention, even when the concentration of cystine in the aqueous solution used for the process is low enough that it could be obtained without added acid.

When a cystine containing solution is used as a pretreatment according to this invention, the autodeposition composition and process themselves and subsequent treatments with other compositions, including rinsing, the use of chromium containing or other known advantageous posttreatment compositions, and heating to stabilize the initially formed coating film, are generally the same as in the prior art. Similarly, when cystine is added to an autodeposition composition to be used in a process according to this invention, the other ingredients of the composition, posttreatments, and conditions of their uses, are generally preferred to be the same as those preferred for the same purposes in the prior art.

The practice of the invention may be further appreciated from the following non-limiting examples.

EXAMPLES

Example and Comparison Example 1

This illustrates a complete coating cycle, including pretreatment with cystine, on a cast iron substrate. The substrates were first cleaned with a conventional strong alkaline cleaner containing surfactants and sodium tripolyphosphate as a sequestering agent at 60° C. for 60 seconds ("sec"), then dip rinsed in ambient temperature tap water for 60 sec. The cleaned and rinsed substrates were then immersed for 60 sec at ambient temperature in a cystine composition made by mixing 950 milliliters ("ml") of deionized water with 50 ml of a cystine prerinse concentrate, the latter having been made by dissolving 20 grams ("g") of commercial L-cystine in one liter of an aqueous hydrofluoric acid solution prepared by mixing 6 parts by volume of commercial 70% aqueous hydrofluoric acid with 19 parts by volume of deionized water.

The samples were removed from the cystine pretreatment composition and allowed to drain for 60 sec but were not rinsed; they were then immersed in a conventional ambient temperature autodeposition composition containing a poly(vinylidene chloride) latex as the major coating component, a black pigment, a biocide, hydrofluoric acid, hydrogen peroxide, and ferric ions, all as taught in Example I of U.S. Pat. No. 4,800,106 of Jan. 24, 1989 to Broadbent (which is hereby incorporated herein by reference), except for the addition of 0.015% by weight hydrogen peroxide to the autodeposition composition. After 90 sec in the autodeposition composition, the sample was removed, allowed to drain and dry for 60 sec in ambient air, rinsed with ambient temperature tap water for 30 sec, and then dried and cured for 20 minutes in an oven at 100° C. Additional samples were processed in the same way, with conventional replenishment of the autodeposition composition as known in the art, until about 2.7 square meters of iron per liter of autodeposition composition had been coated. Film build rates and all other conventionally measured properties of the autodeposition composition indicated that it was still operating stably.

The resistance to rusting under exposure to neutral salt spray was significantly greater for the substrates coated according to this example than for others coated similarly, except for omitting the cystine pretreatment step, this latter procedure being designated as Comparison Example 1.

Example and Comparison Example 2

This example illustrates the use of a cystine pretreatment in combination with a modified autodeposition bath and a chromate posttreatment to obtain excellent results for protecting galvanized steel substrates, including both hot dipped ("HDG") and electrogalvanized ("EG").

Substrates for these experiments were initially cleaned by 120 sec immersion at 41° C. in a conventional alkaline cleaner including silicates, phosphates, and surfactants. The substrates were then rinsed by 30 sec immersion at ambient temperature in tap water. Substrates according to the example were then immersed for 60 sec at ambient temperature in an aqueous composition (made with deionized water) containing 1 gram/liter ("g/L") of cystine and 50 ml/L of commercial 70% hydrofluoric acid. Substrates according to the comparative example were similarly treated, except that the composition contained the hydrofluoric acid but not the cystine.

Both types of substrates were then given a deionized water rinse by spraying for 15 sec at ambient temperature, then immersed for 120 sec in the autodeposition composition. This composition was the same as that used for Example 1, except that the total solids content was 8% instead of 5% by weight, the ferric ion content was 1.7 g/L instead of 1.8 g/L, and the hydrofluoric acid concentration was 1.0 g/L rather than 2.3 g/L.

After the period in the autodeposition composition, the samples were removed and allowed to drain and dry in the ambient air for 60 sec, then immersed in a water rinse tank for another 60 sec at ambient temperature, then immersed for 60 sec at ambient temperature in an aqueous solution of 1 g/L ammonium dichromate, removed and allowed to drain, and finally dried and cured in an oven at 100° C. for 20 minutes. The coated film thickness was about 28 microns ("$\mu$m") on each sample.

Samples coated as described above were evaluated by conventional neutral salt spray after scribing. The results for the salt spray are reported as the average and maximum distance from the scribe line in which rusting was observed, and they are also rated for condition of the entire surface ("Field"), by comparison against standardized controls, on a scale from 0 to 10 (worst to best), as described in greater detail in the procedures for American Society for Testing Materials ("ASTM") Test D 1654. The results are shown in Table 1 below.

TABLE 1

| Comparison of Corrosion Resistance, Ex. and Comp. Ex. 2 | | |
|---|---|---|
| Substrate Type and Ex. # | Salt Spray Average/Maximum (mm) | Field Score |
| HDG 2 | 3.0/7.0 | 8.0 |
| HDG Comp. 2 | 3.0/5.0 | 7.5 |
| EG 2 | 1.2/3.5 | 9.2 |
| EG Comp. 2 | 3.0/11.0 | 9.2 |

Example and Comparison Example 3

An autodeposition composition was prepared as in Example 1, except that 1.0 g/L of cystine was added to the other ingredients used in Example 1. A cast iron specimen was then subjected to the same process sequence as described as in Example 1, except that the exposure for sixty seconds to a solution of cystine and hydrofluoric acid was replaced by exposure for the same length of time, at 60° C., to an aqueous solution of about 2.5% by weight of phosphoric acid ($H_3PO_4$) and about 0.03% by weight of conventional nonionic surfactant. This sequence was used for Comparison Example 3. Example 3 was the same as for Comparison Example 3, except that the autodeposition bath used contained cystine as noted at the beginning of the description of this Example. After the same type of testing as described in Example 2, the incidence of pinholing was observed to be much less for Example 3 than for Comparative Example 3.

What is claimed is:

1. In a coating process sequence wherein an autodeposition coating of adherent polymer is formed on a metal surface by contacting said metal surface with an autodepositing composition, the improvement comprising contacting said metal surface, prior to or during its contact with said autodepositing composition, with a liquid composition containing cystine in an amount effective to reduce the formation of holes in the coating formed during the coating process sequence.

2. A process according to claim 1, wherein said liquid composition containing cystine contains a concentration of at least about 25 ppm thereof.

3. A process according to claim 2, wherein said contacting said metal surface with a liquid composition containing cystine includes a separate process step prior to contact with said autodepositing bath.

4. A process according to claim 1, wherein said contacting said metal surface with a liquid composition containing cystine includes a separate process step prior to contact with said autodepositing bath.

5. A process according to claim 4, wherein the liquid composition used in said separate process step consists essentially of water, hydrofluoric acid, and cystine, and, optionally, surfactant cleaning agent or agents.

6. A process according to claim 3, wherein the liquid composition used in said separate process step consists essentially of water, hydrofluoric acid, and cystine, and optionally, surfactant cleaning agent or agents.

7. A process according to claim 6, wherein the autodeposition composition includes a polymer component that predominantly comprises copolymers of (a) between about 45 and about 99 weight % of vinylidene chloride, (b) between about 0.5 and about 30 weight % of an unsaturated monomer that has a solubility of at least 1 weight % in each of water and vinylidene chloride at the temperature of polymerization, and (c) between about 0.1 and about 5 weight % of monomers selected from sulfonic acids and salts thereof having the formula $R-Z-(CH_2)_n-(SO_3)-M$, wherein R is either a vinyl or an α-substituted vinyl radical, Z is a difunctional linking group that will activate the double bond present in R, n is an integer between 1 and 4, and M is a cation.

8. A process according to claim 5, wherein the autodeposition composition includes a polymer component that predominantly comprises copolymers of (a) between about 45 and about 99 weight % of vinlidene chloride, (b) between about 0.5 and about 30 weight % of an unsaturated monomer that has a solubility of at least 1 weight % in each of water and vinylidene chloride at the temperature of polymerization, and (c) between about 0.1 and about 5 weight % of monomers selected from sulfonic acids and salts thereof having the formula $R-Z-(CH_2)_n-(SO_3)-M$, wherein R is either a vinyl or an α-substituted vinyl radical, Z is a difunctional linking group that will activate the double bond present in R, n is an integer between 1 and 4, and M is a cation.

9. A process according to claim 4, wherein the autodeposition composition includes a polymer component that predominantly comprises copolymers of (a) between about 45 and about 99 weight % of vinylidene chloride, (b) between about 0.5 and about 30 weight % of an unsaturated monomer that has a solubility of at least 1 weight % in each of water and vinylidene chloride at the temperature of polymerization, and (c) between about 0.1 and about 5 weight % of monomers selected from sulfonic acids and salts thereof having the formula $R-Z-(CH_2)_n-(SO_3)-M$, wherein R is either a vinyl or an α-substituted vinyl radical, Z is a difunctional linking group that will activate the double bond present in R, n is an integer between 1 and 4, and M is a cation.

10. A process according to claim 3, wherein the autodeposition composition includes a polymer component that predominantly comprises copolymers of (a) between about 45 and about 99 weight % of vinylidene chloride, (b) between about 0.5 and about 30 weight % of an unsaturated monomer that has a solubility of at least 1 weight % in each of water and vinylidene chloride at the temperature of polymerization, and (c) between about 0.1 and about 5 weight % of monomers selected from sulfonic acids and salts thereof having the formula $R-Z-(CH_2)_n-(SO_3)-M$, wherein R is either a vinyl or an α-substituted vinyl radical, Z is a difunctional linking group that will activate the double bond present in R, n is an integer between 1 and 4, and M is a cation.

11. A process according to claim 2, wherein the autodeposition composition includes a polymer component that predominantly comprises copolymers of (a) between about 45 and about 99 weight % of vinylidene chloride, (b) between about 0.5 and about 30 weight % of an unsaturated monomer that has a solubility of at least 1 weight % in each of water and vinylidene chloride at the temperature of polymerization, and (c) between about 0.1 and about 5 weight % of monomers selected from sulfonic acids and salts thereof having the formula $R-Z-(CH_2)_n-(SO_3)-M$, wherein R is either a vinyl or an α-substituted vinyl radical, Z is a difunctional linking group that will activate the double bond present in R, n is an integer between 1 and 4, and M is a cation.

12. A process according to claim 1, wherein the autodeposition composition includes a polymer component that predominantly comprises copolymers of (a) between about 45 and about 99 weight % of vinylidene chloride, (b) between about 0.5 and about 30 weight % of an unsaturated monomer that has a solubility of at least 1 weight % in each of water and vinylidene chloride at the temperature of polymerization, and (c) between about 0.1 and about 5 weight % of monomers selected from sulfonic acids and salts thereof having the formula $R-Z-(CH_2)_n-(SO_3)-M$, wherein R is either a vinyl or an α-substituted vinyl radical, Z is a difunctional linking group that will activate the double bond present in R, n is an integer between 1 and 4, and M is a cation.

13. A process according to claim 14, wherein the metal surface is galvanized steel.

14. A process according to claim 10, wherein the metal surface is galvanized steel.

15. A process according to claim 8, wherein the metal surface is galvanized steel.

16. A process according to claim 5, wherein the metal surface is galvanized steel.

17. A process according to claim 4, wherein the metal surface is galvanized steel.

18. A process according to claim 3, wherein the metal surface is galvanized steel.

19. A process according to claim 2, wherein the metal surface is galvanized steel.

20. A process according to claim 4, wherein the metal surface is galvanized steel.

* * * * *